W. S. ROCKWELL.
FRICTIONALLY HELD BLAST GATE.
APPLICATION FILED SEPT. 27, 1916.
1,211,371. Patented Jan. 2, 1917.
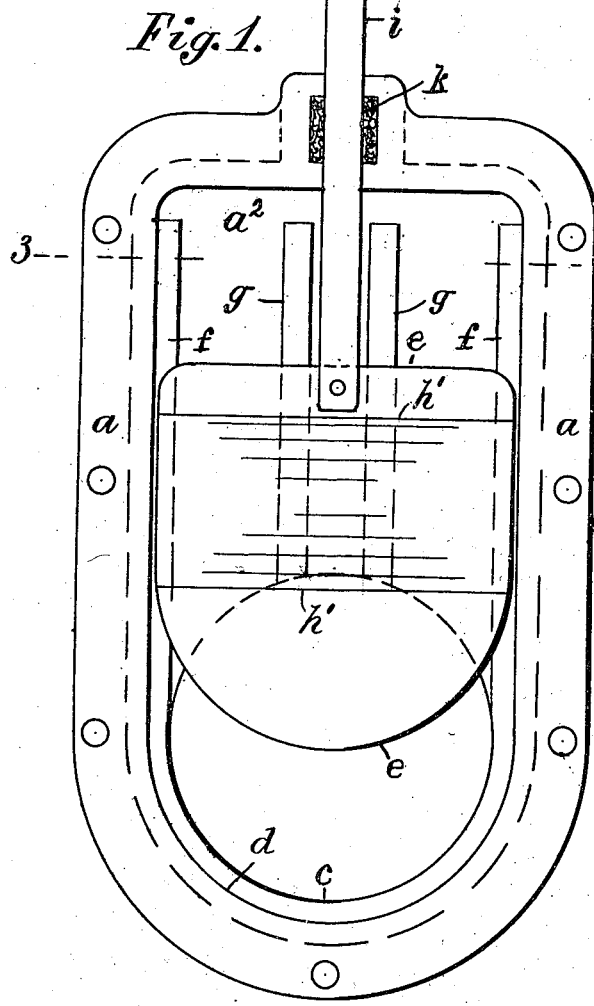
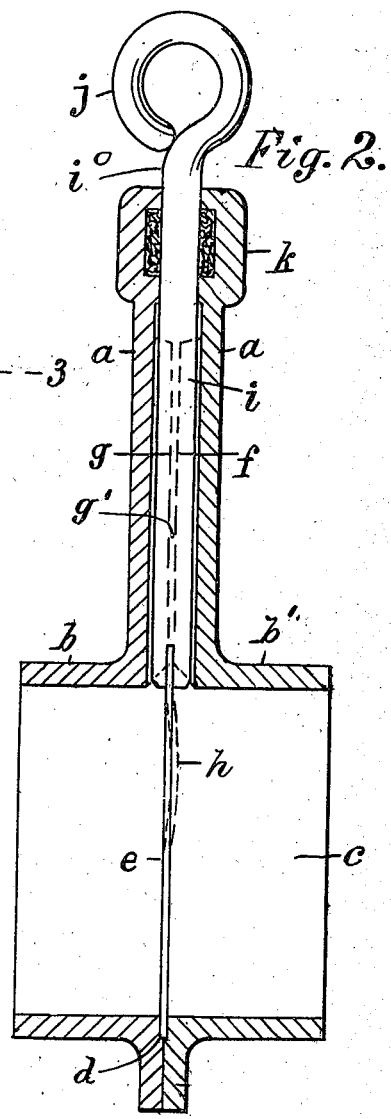
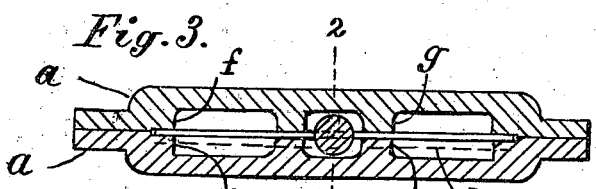

UNITED STATES PATENT OFFICE.

WALTER S. ROCKWELL, OF NEW YORK, N. Y., ASSIGNOR TO W. S. ROCKWELL COMPANY, OF NEW YORK, N. Y., A CORPORATION OF NEW JERSEY.

FRICTIONALLY-HELD BLAST-GATE.

1,211,371.        Specification of Letters Patent.      Patented Jan. 2, 1917.

Application filed September 27, 1916. Serial No. 122,359.

*To all whom it may concern:*

Be it known that I, WALTER S. ROCKWELL, a citizen of the United States, residing at 300 West One Hundred and Sixth street, New York, county of New York, and State of New York, have invented certain new and useful Improvements in Frictionally-Held Blast-Gates, fully described and represented in the following specification and the accompanying drawings, forming a part of the same.

This invention relates to a gate for regulating the air-blast supplied to forges and furnaces, and for other purposes, and the object of the invention is to prevent the accidental displacement of the valve-plate in the gate which frequently occurs in practice from the vibrations of the blast in the air-pipe, and other causes which jar the valve-plate and shift it from its adjusted position.

Such accidental displacement is prevented in the present invention by a frictional resistance which is produced by slightly bowing or concaving the valve-plate between its edges and fitting it to move between guides in the valve-casing which force the plate into a flat position and thus develops an elastic pressure of the valve-plate against the casing, and induces the friction desired.

The valve-plate may be bowed longitudinally or transversely. The construction is such that the induced friction suffices to prevent accidental displacement while it does not prevent the manual adjustment of the valve-plate to open or close the gate.

The blast-gate shown herein is provided with a casing made in two sections and provided with inlet and outlet collars upon its opposite sides for connecting the gate to a blast-pipe, and it has a closed chamber at one side of the passage (connecting with the passage) into which chamber the valve-plate is retracted when opening the gate. A rod is connected with the valve-plate and extended through and outside of the chamber to be manipulated for the adjustment of the valve-plate.

The invention will be understood by reference to the annexed drawing, in which—

Figure 1 shows the inner side of the casing-section $a$ with the valve-plate therein; Fig. 2 is a longitudinal section of the same, where hatched upon the line 2—2 in Fig. 3; Fig. 3 is a cross section on line 3—3 in Fig. 1; and Fig. 4 is a cross section of the valve-plate showing the curvature of the same. Fig. 5 shows an alternative construction for the casing.

In Figs. 1, 2 and 3, the casing is formed of two similar sections $a$ provided respectively with collars $b$, $b'$, and a passage $c$ through the same. The sections $a$ are secured together by bolts through their margins.

The sections are formed with a chamber $a^2$ at one side of the passage $c$, and a groove $d$ is extended from the chamber around the lower half of the passage, and a valve-plate $e$ fitted to such groove and movable into and out of the chamber, which is made of suitable width to clear the edges of the plate.

The walls of the chamber are separated enough to permit the passage of a handle-rod $i$ which is secured to the edge of the valve-plate next the chamber, and extended through a stuffing-box $k$ on the chamber and provided upon its end with a handle $j$ for adjusting the valve-plate. The plate is made of sheet-metal of such thickness that the bowed portion may be wholly or partially flattened by the casing so as to press elastically against the casing. Such curvature may be transverse to the movement of the plate, as indicated in Figs. 1 and 2, or longitudinal of the plate, as indicated by dotted line $h^2$ in Fig. 13, or confined to a portion of the plate, as in Fig. 2.

Figs. 1 and 2 show a portion of the plate bowed between its connection to the rod $i$ and the semi-circular portion which fits the groove $d$ in the passage $c$. The location of such bowed portion upon the plate is indicated by the dotted line $h$ in Fig. 2, and its limits are defined by lines $h'$ upon the plate in Fig. 1, between which the curvature of the plate would be apparent when it is removed from its casing.

The casing is formed at the edges of its chamber with ribs $f$ and at opposite sides of the rod $i$ with ribs $g$, between which only sufficient space is provided for the movement of the plate, so that the ribs flatten or compress the bowed portion.

The opposition of the ribs is shown in dotted lines in Fig. 2, with a channel $g'$ between them for the passage of the plate when flattened.

The curved portion of the plate is bent or compressed in moving through the channel $g'$, and thus exerts pressure and friction to produce a yielding resistance to any accidental displacement of the plate.

The ribs are needed to press upon opposite sides of the plate when the chamber is made deep enough for the passage of the rod, but Fig. 5 shows a casing in which the chamber is made about the same depth as the thickness of the plate, to press directly upon the plate, and each casing-section has a groove $e'$ which provides clearance for the passage of the rod to the stuffing-box $k$. The plate may, if preferred, be bowed across its entire width or length, as indicated in the curved plate of Fig. 4, as it is not material to the invention whether a whole or part of a plate is bowed, nor what provision is made in the casing to press upon the curved portion of the plate, so as to generate a frictional resistance to its movement. Fig. 3 merely expresses the longitudinal curving of the plate by the dotted line $h^2$.

The effect is the same with both the constructions for the casing, as the channel or space in which the plate moves in the entire casing flattens the bowed portion sufficiently to generate the desired friction.

It is evidently immaterial to the operation of the bowed valve-plate whether or not the chamber into which the plate is retracted from the passage $c$ is closed at its outer end, or has any stuffing-box, as any chamber may be used which furnishes means to press upon the bowed portion of the valve-plate as desired.

Having thus set forth the nature of the invention what is claimed herein is.

1. A blast-gate having a casing with an air-passage through the same and a chamber within the casing at one side of the passage, a groove extended from the chamber around the passage, a valve-plate movable in the groove and casing, and slightly bowed between its edges and pressed by the said casing elastically, to hold the plate from accidental displacement.

2. A blast-gate having a casing with an air-passage through the same and a chamber within the casing at one side of the passage, a groove extended from the chamber around the passage, a coincident channel in the chamber, a valve-plate fitted to the said groove and channel, and a rod extended from the plate outside of the chamber, the plate being slightly bowed or concaved between its edges, and its convex side pressed in said channel to produce a frictional resistance to accidental displacement while permitting free movement of the plate by means of the rod.

3. A blast-gate having a plate formed of two similar longitudinal sections each having a half channel forming a chamber therein, a groove extended around the passage in a line with the channel, a valve-plate fitted to the said groove and channel and having a rod extended outside of the chamber, and the plate being slightly bowed to produce a frictional resistance to accidental displacement.

In testimony whereof I have hereunto set my hand.

WALTER S. ROCKWELL.